May 20, 1952 — L. D. HILLYER — 2,597,485
WEED DESTROYING MACHINE
Filed March 8, 1949 — 2 SHEETS—SHEET 1

Inventor
Laurence D. Hillyer
By Clarence A. O'Brien
and Harvey B. Jacobson
Attorneys May 20, 1952  L. D. HILLYER  2,597,485
WEED DESTROYING MACHINE
Filed March 8, 1949  2 SHEETS—SHEET 2
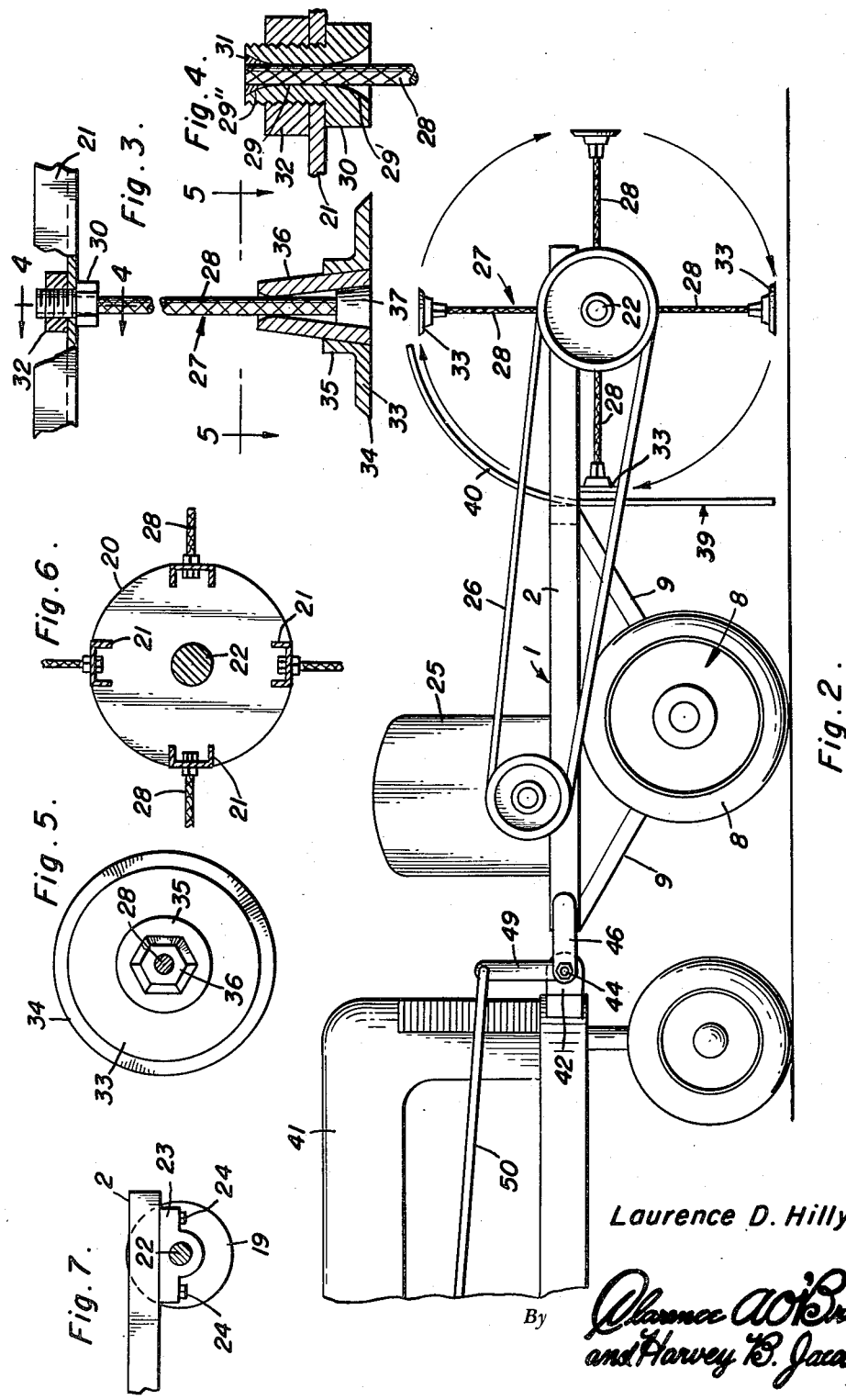
Inventor
Laurence D. Hillyer Patented May 20, 1952

2,597,485

UNITED STATES PATENT OFFICE 2,597,485

WEED DESTROYING MACHINE

Laurence D. Hillyer, Alice, Tex.

Application March 8, 1949, Serial No. 80,252

1 Claim. (Cl. 55—118)

My invention relates to weed destroying machines of the beater lacerating type forming the subject matter of my U. S. Letters Patent No. 2,162,434 over which the instant invention is designed as an improvement.

The primary object of the instant invention is to provide a weed destroying machine with flexible, revolving beaters and lacerating weed severing devices which are more effective to beat, lacerate, and cut in the field different types of weeds, cactus, and the like, than those of my above noted patent, and especially designed for easy quick conditioning to obtain the best results with a wide variety of different types of weeds.

Another object is to provide a machine of the character and for the purposes above set forth which is designed to be positioned in front of a farm tractor to be pushed by the tractor according to operating requirements.

Still another object is to provide in such a machine improved means for varying the height from the ground at which the beaters and lacerating weed severing devices operate to obtain the best results in destroying different types of weeds.

Still another object is to provide for scattering, broadcast, over the ground the severed weeds throughout a wider area than can be accomplished with the machine of my aforesaid patent so that the scattered weeds will act effectively as fertilizer when rotted.

Still another object is to provide a simply constructed, inexpensive machine for accomplishing the foregoing and which will require a minimum of serving and is well adapted to withstand the rough use to which such machines are necessarily subjected.

Other and subordinate objects, within the purview of my invention, together with the precise nature of my improvement will be readily understood when the succeeding description and claim are read with reference to the drawings, accompanying and forming part of this specification.

In said drawings:

Figure 2 is a view in side elevation of the same;

Figure 3 is a fragmentary view in section taken on the line 3—3 of Figure 1 and drawn to a larger scale, with the parts turned at an angle of 90 degrees;

Figure 4 is a fragmentary view in vertical section taken on the line 4—4 of Figure 3 and drawn to a larger scale;

Figure 5 is a view in horizontal section taken on the line 5—5 of Figure 3;

Figure 6 is a fragmentary view in transverse section taken on the line 6—6 of Figure 1 and drawn to a larger scale;

Figure 7 is a fragmentary view in transverse section taken on the line 7—7 of Figure 1 and with parts removed.

Figure 1:
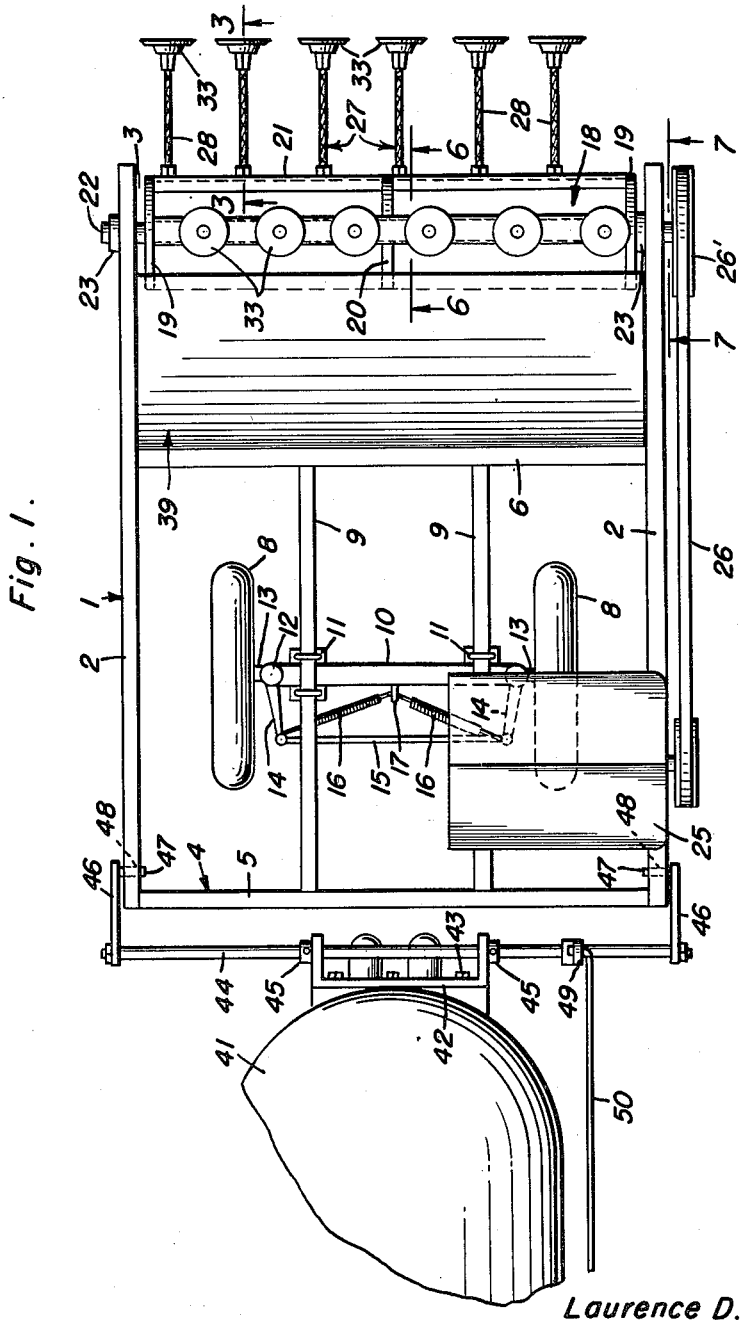
Figure 1 is a view in plan of my improved machine coupled to the front end of a farm tractor to be pushed thereby.

Referring to the drawings by numeral, my improved machine, as shown, comprises a substantially rectangular frame 1 including a pair of side bars 2, and which is open at one end, designated 3, and closed at its other end, hereinafter termed its coupling end 4, by a cross bar 5 which, together with an intermediate cross bar 6, connects the side bars 2 together.

The frame 1 is mounted, by means presently described, intermediate the coupling end 4 and its open end 3, on a pair of suitable ground wheels 8, preferably with pneumatic tires 8', so that said frame is overbalanced at its open end on said wheels and is tiltable on said wheels vertically, for a purpose presently clear.

The means for mounting the frame 1 on the ground wheels 8 comprises a pair of V-shaped bars 9 connected to the cross bars 5, 6 upon opposite sides of the longitudinal center of said frame 1 and which are supported by a cross bar 10 secured thereto by shackles 11 and provided with the usual steering knuckles 12 with wheel spindles 13 thereon and steering arms 14 extending therefrom and connected by a cross link 15. A pair of helical springs 16 connect the steering arms 14 to an eye bolt 17 on the cross bar 10 so that the steering knuckles 12 may yieldingly pivot and the ground wheels 8 function for steering of the machine by the tractor when the machine is being pushed.

A revolving assembly of my improved beater and lacerating weed cutting devices is provided at the open end 3 of the frame 1 to be revolved about an axis transverse of said frame 1 by a power driven reel 18 which comprises end disks 19, an intermediate disk 20, longitudinal channel bars 21 connecting said disks and spaced equidistantly around the disks with channel sides innermost, and a reel shaft 22 extending across said frame 1 through said disks 19, 20 with its ends journaled in bearings 23 bolted, as at 24, to the side bars 2 at the open end 3 of said frame. A suitable motor 25 on the frame 1 is operatively connected to one end of the reel shaft 22 by a belt 26 and a pulley 26' on said shaft 22.

The beater and lacerating weed severing devices 27 each comprise a steel cable member 28 of any suitable length with an inner end anchored in an axial bore 29 of a headed stud 30, the bores 29 being flared at one end, as at 29', to prevent cutting of the cable members and at the other end, as at 29'', for pouring in melted suitable metal 31, or the like, to harden and anchor the inner ends of the cable members 28 in said studs 30.

A plurality of the cable members 28 are detachably attached to each channel bar 21 in equi-distantly spaced relation along the same, by the studs 30 which are threaded through said bars 21 with nuts 32 thereon in the channels of said bars 21, said cable members 28 on alternate channel bars 21 being staggered relative to those on intermediate channel bars. As will be obvious, the cable members 28 will be revolved by rotation of the reel 18 through the open end 3 of the frame 1 and, under the action of centrifugal force, will assume a substantial radial position relative to the axis of revolution thereof.

At the outer end of each cable member 28 is a flat bottomed impact disk 33 with a beveled cutting edge 34 and a hub 35 on one side thereof internally polygonal and flared in a direction opposite to the inner end of the cable members 28. The hub 35 of the impact disk 33 is wedged onto the outer end of a similarly flaring bushing 36 secured on the outer end of the cable member 28 by a similarly flared plug 37 suitably secured on said member 28 and wedged into or suitably fixed in the outer larger end of the bushing 36. The bushing 36 is polygonal externally to fit in the hub 35 of the impact disk 33 and prevent said disk 33 from turning about the same and about the cable member 28. As will be seen, the impact disk 33 may be knocked loose from the bushing 36, as by a hammer, turned on the bushing 36 and relative to the cable member 28 and then wedged in turned position back onto the bushing 36 all for a purpose presently described. By detaching the nuts 32 of any of the described beater and lacerating weed severing devices 27, the entire device may be detached from the reel 18 for replacement or repair. As will also be obvious, the impact disks 33 are maintained tightly wedged on the bushings 36, under the action of centrifugal force and the bushings 36 are similarly wedged tightly on the plugs 37.

A guard plate 39 extends across the frame 1 between the described beater and lacerating assembly and the ground wheels 8 and depends vertically from said frame with an upper edge 40 curving over the revolving beater and lacerating assembly toward the open end 3 of the frame 1. The particular advantage of the guard 39 will presently be explained.

Means are provided for coupling the frame 1 of the described machine to the front end of a tractor 41 for pushing by said tractor with the assembly of beater and lacerating devices 27 leading, said means comprising the following.

A U-shaped bracket 42 is detachably attached, in horizontal position to the front end of the tractor 41 by bolts 43. A rock shaft 44 is journaled in the bracket 42 to extend across the front end of the tractor 41. Set collars 25 on the rock shaft 44, engaging the ends of the bracket 42, prevent end play of said shaft in said bracket. A pair of crank arms 46 fast on the ends of the rock shaft 44 straddle the coupling end 4 of the frame 1 and are pivotally connected to the side bars 2 by lateral pins 47 thereon extending into suitable apertures 48 provided in said bars 2. An upstanding lever 49 is fast on the rock shaft 47, to extend along one side of the tractor 41. A shaft rocking lever 50 is suitably connected to said lever 49 to extend rearwardly alongside the tractor 41 for operation from the rear platform (not shown) of said tractor.

Referring now to the operation of the invention, with the described machine coupled to the front end of the tractor 41, said machine is pushed in front of the tractor with the assembly of beater and lacerating devices 27 leading and with the ground wheels pivoting to facilitate steering the machine by the tractor, said wheels, under the influence of the springs 16, tending to maintain the machine in a straight course. The assembly and lacerating devices 27 are revolved clockwise, as viewed in Figure 2, whereby the same are swung downwardly and rearwardly at the open end 3 of the frame 1. The frame 1 is tilted to swing the open end 5 thereof vertically so that the disks 19 clear the ground a suitable distance for severing the weeds, or the like, at the desired distance from the ground. Such adjustment of said frame 1 is accomplished by operating the shaft rocking rod 50 so as to rock the lever 49 and thereby rock the rock shaft 44 and swing the crank arms 46 vertically whereby to vary the height of the coupling end 4 of the frame 1 relative to the ground.

As the beater and lacerating weed severing devices 27 are revolved, the disks 19 impact the weeds, not shown, with a beating, flailing, and lacerating action and sever the same. The severed weeds are carried upwardly and rearwardly, as regards the assembly, by the cable members 27 and the disks 33 and against the guard plate 39 and then thrown forwardly under the guidance of the upper edge portion 40 of said plate to be broadcast over the top of said assembly and forwardly of the same. By turning the disks 33 in the manner previously described, relative to the cable members 28, different portions of the cutting edges 34 thereof may be positioned for operation against the weeds so that a sharp portion may be presented in operating position when another portion becomes dull, or damaged.

The foregoing will, it is believed, suffice to impart a clear understanding of my invention, without further explanation.

Manifestly, the invention, as described, is susceptible of modifications, without departing from the inventive concept, and right is herein reserved to such modifications as fall within the scope of the appended claim.

Having described the invention, what is claimed as new is:

In a machine of the class described, a revolving assembly of beater and lacerating weed severing devices comprising a reel rotatably mounted in horizontal position, cables having inner ends attached to said reel in circumferentially and longitudinally spaced position relative to the same, flared plugs on the outer ends of said cables, flared polygonal bushings wedged onto said plugs, and impact disks with cutting edges and having internally flared hubs wedged onto said flared bushings and polygonal to prevent the hubs from turning on said bushings, said flared bushings tending to be wedged tight on said plugs and said flared hubs tending to be wedged tight on said flared bushings under the action of centrifugal force when the beater assembly is revolved, said bushings extending through and outwardly of said hubs and having the smaller ends thereof fitting around said cables at a point remote from said plugs.

LAURENCE D. HILLYER.

REFERENCES CITED

The following references are of record in the file of this patent:

UNITED STATES PATENTS

| Number | Name | Date |
|---|---|---|
| 1,035,056 | Shubert et al. | Aug. 6, 1912 |
| 1,263,965 | Twitchel | Apr. 23, 1918 |
| 1,505,572 | McDonald | Aug. 19, 1924 |
| 1,542,963 | Russell | June 23, 1925 |
| 1,862,035 | Rainwater | June 7, 1932 |
| 1,893,871 | Romera | Jan. 10, 1933 |
| 2,341,486 | Swertfeger | Feb. 8, 1944 |

FOREIGN PATENTS

| Number | Country | Date |
|---|---|---|
| 368,762 | Germany | Feb. 9, 1923 |
| 593,225 | Great Britain | Oct. 10, 1947 |